Sept. 16, 1952 W. P. OEHLER ET AL 2,610,455
OFFSET DISK HARROW
Filed Jan. 30, 1948 5 Sheets-Sheet 1
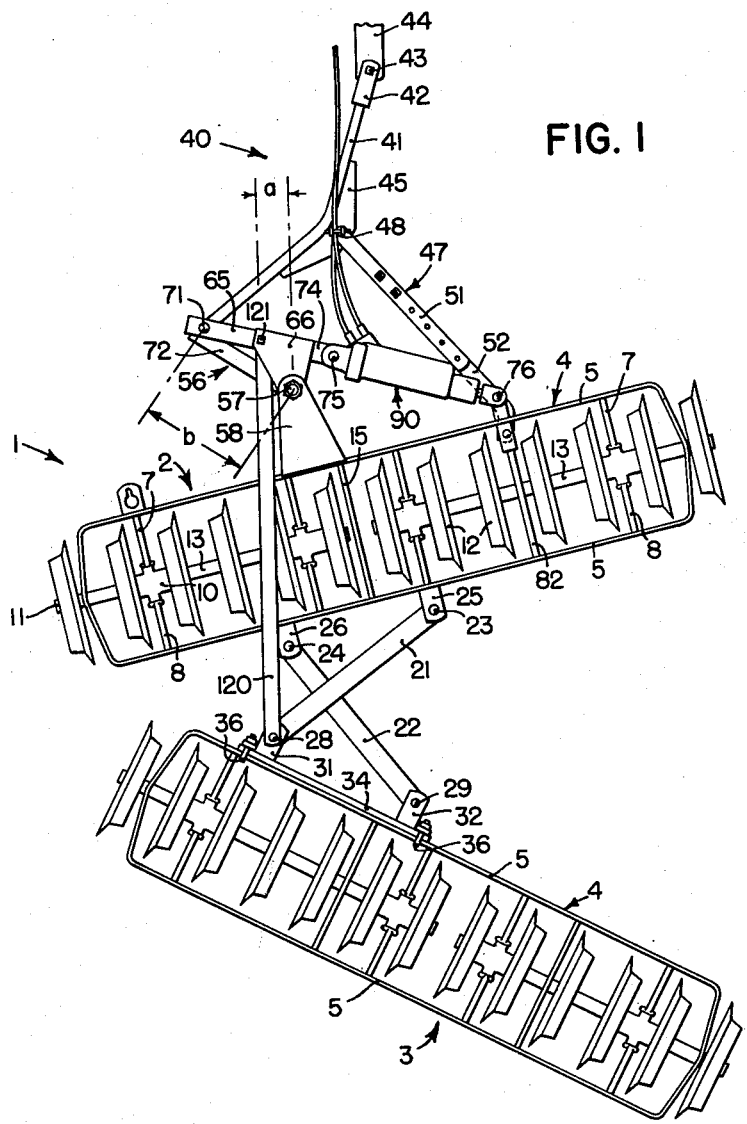
FIG. 1
*INVENTORS*
WILLIAM P. OEHLER
CHARLES H. YOUNGBERG
BY
ATTORNEYS

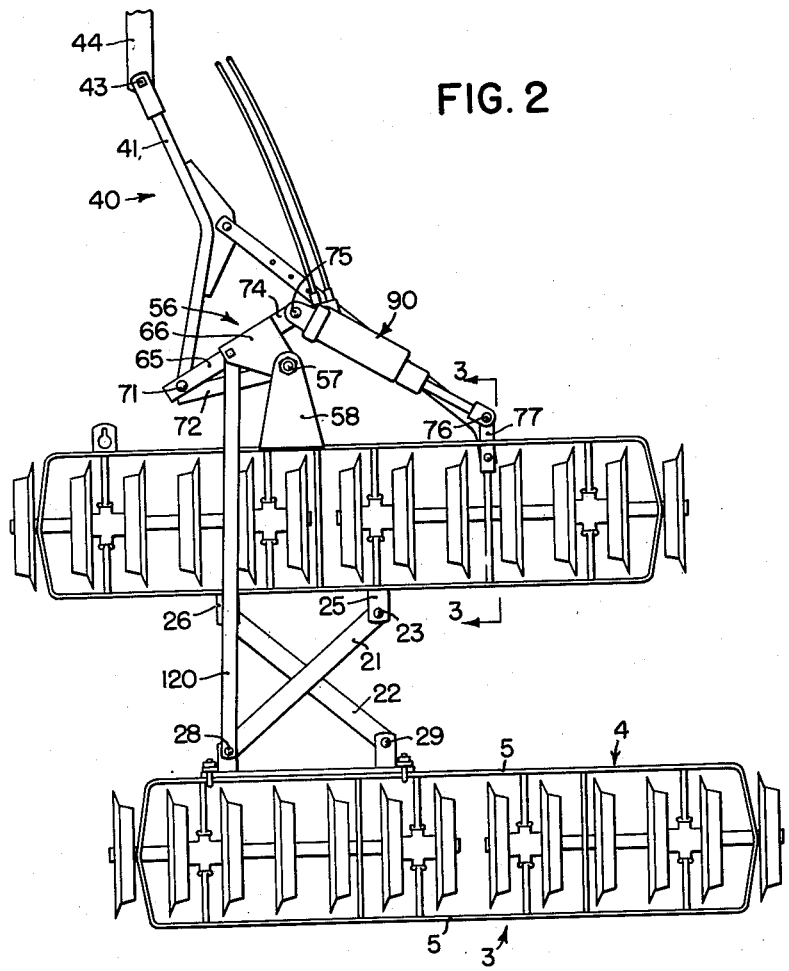

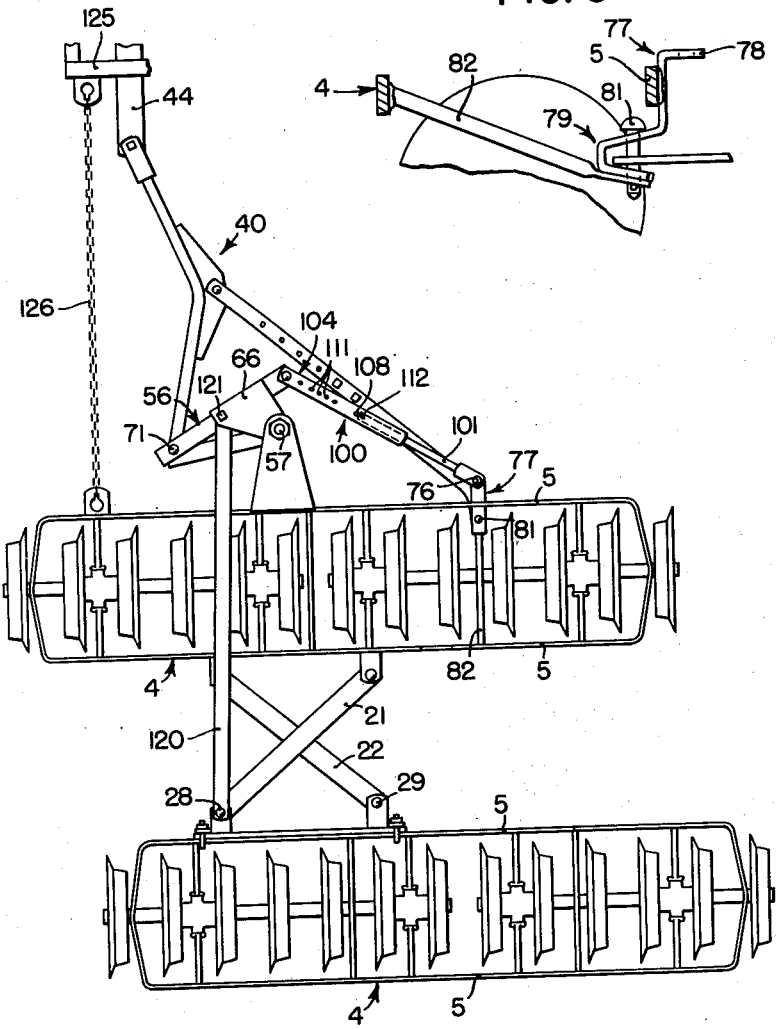

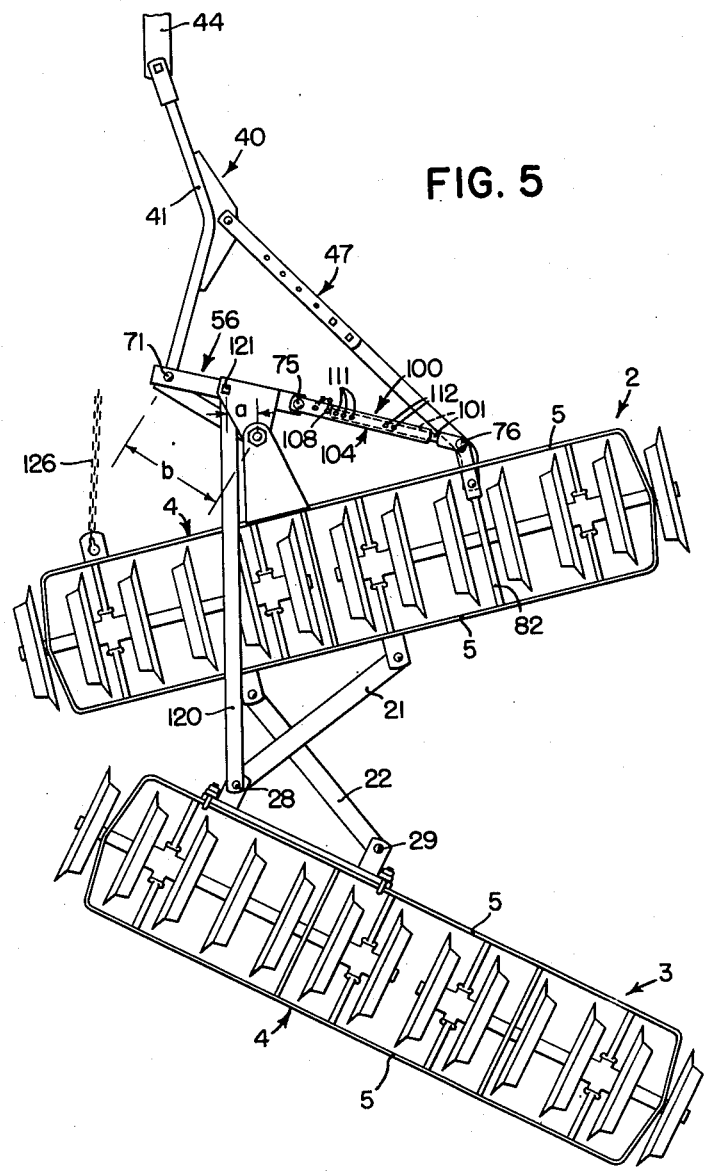

Sept. 16, 1952 W. P. OEHLER ET AL 2,610,455
OFFSET DISK HARROW
Filed Jan. 30, 1948 5 Sheets-Sheet 5
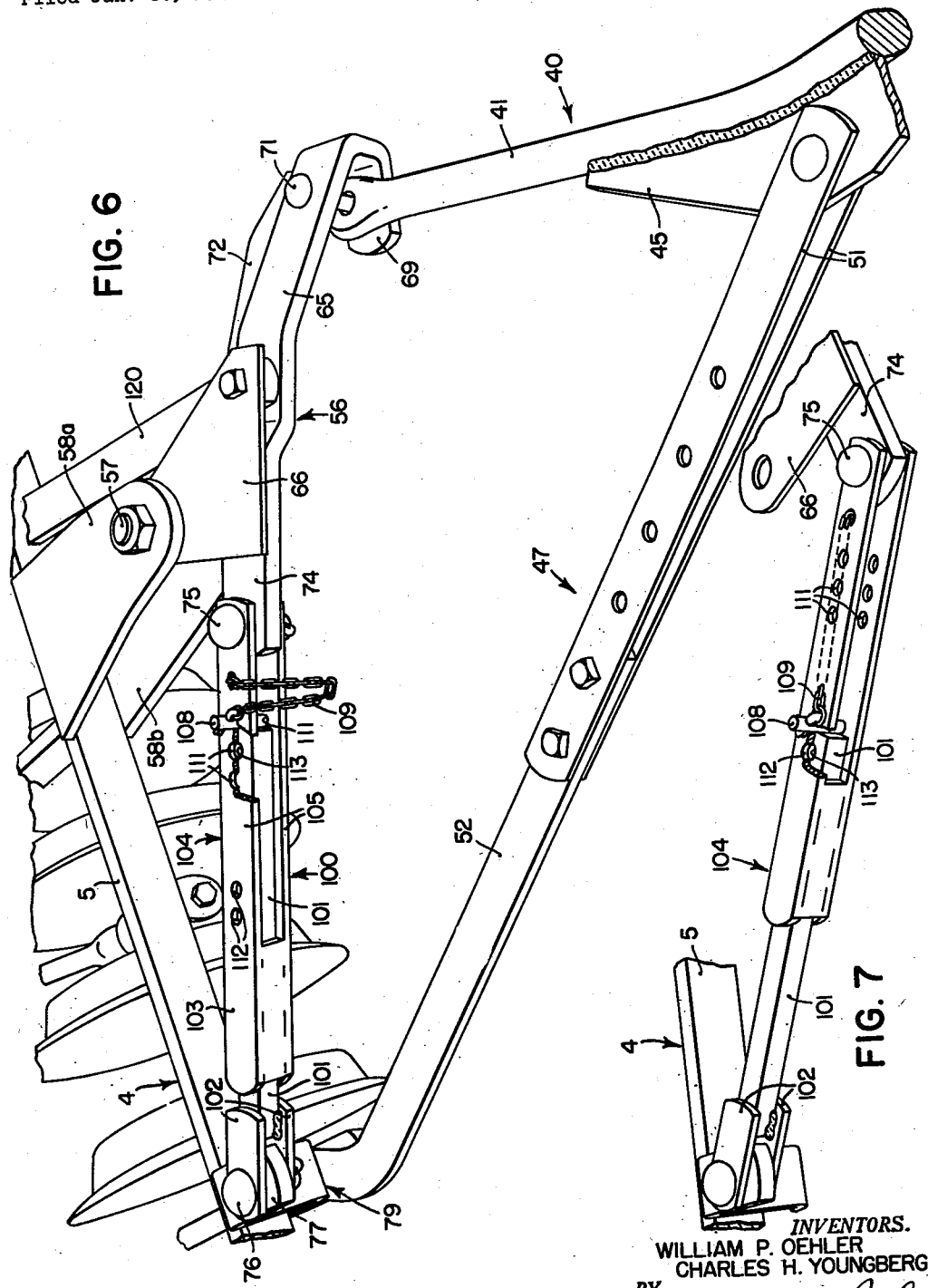
INVENTORS.
WILLIAM P. OEHLER
CHARLES H. YOUNGBERG
BY
ATTORNEYS Patented Sept. 16, 1952

2,610,455

UNITED STATES PATENT OFFICE 2,610,455

OFFSET DISK HARROW

William P. Oehler and Charles H. Youngberg, Moline, Ill., assignors to Deere & Company, Moline, Ill., a corporation of Illinois Application January 30, 1948, Serial No. 5,256

8 Claims. (Cl. 55—83)

The present invention relates generally to agricultural implements and more particularly to offset disk harrows.

The object and general nature of the present invention is the provision of a disk harrow of the offset type having front and rear gangs normally movable from a straightened parallel or transport position into an angled or working position as an incident to the soil pressure acting against the disks when the machine is propelled forwardly, but which does not require any locks, latching means or the like for holding the disks at the desired angle, irrespective of adverse soil conditions and/or variations in soil conditions or the like.

More particularly, it is a feature of this invention to provide a disk harrow of the offset type which is specially constructed and arranged to be hitched to a farm tractor and operated thereby conveniently and efficiently, irrespective of whether or not the tractor is equipped with implement-controlling power means, such as a hydraulic motor, hydraulic piston and cylinder unit, or the like. More specifically, it is a feature of this invention to provide an offset disk harrow incorporating a linkage acting between the front and rear gangs and connected to one side of the hitch structure for the harrow so that the force of the draft acting on the linkage for swinging the rear gang relative to the front gang with an angled or working position so acts at such mechanical advantage that soil pressure acting against the disks, particularly on the disks of the rear gang, is not effective to swing the gangs into a position of lesser angle, yet the linkage and associated parts are so arranged that swinging of the gangs into their transport or parallel straightened position may easily and quickly be effected.

These and other objects and advantages of the present invention will be apparent to those skilled in the art after a consideration of the following detailed description, taken in conjunction with the accompanying drawings, in which:

Figure 1 is a plan view of an offset disk harrow incorporating the present invention, the harrow being shown in angled or working position and as controlled by a hydraulic power cylinder;

Figure 2 is a view showing the harrow of Figure 1 in its transport or straightened position;

Figure 3 is a fragmentary sectional view taken along the line 3—3 of Figure 2;

Figures 4 and 5 are views similar to Figures 1 and 2, showing the harrow with a manual control; and Figures 6 and 7 are perspective views showing the details of the manual control.

Referring now to the drawings, the offset disk harrow which has been chosen to illustrate the principles of the present invention is indicated in its entirety by the reference numeral 1 and comprises a front gang 2 and a rear gang 3, each of the gangs including a horizontally disposed frame 4 made up of a pair of bars 5 having their ends bent inwardly and welded together to form a generally rectangular frame. The rear gang frame is of similar construction and like reference numerals are employed. Each frame carries a plurality of pairs of bearing standards 7 and 8, each pair being disposed in downwardly converging relation and welded at their upper ends to the frame bars 5 and at their lower ends are secured to a disk gang bearing unit 10. So far as the present invention is concerned, the latter is of conventional construction and provides for the reception of a gang bolt 11 on which disks 12 are disposed, with their spacing spools 13 between the disks. The central portion of each of the frames 4 is reenforced by a cross bar 15 the ends of which are welded to the central portions of the bars 5 forming the associated frame 4.

The front and rear gangs 2 and 3 are pivotally interconnected for movement into and out of angled and transport or parallel positions by a pair of angling links 21 and 22, the front ends of which are connected by pivots 23 and 24 to a pair of brackets 25 and 26 fixed, as by welding, to the rear bar 5 on the front gang frame 4. The rear ends of the angling links 21 and 22 are pivotally connected, as at 28 and 29, to a pair of brackets 31 and 32 that are fixed, as by welding, to a rear bar 34 that is fixed to the front bar 5 of the rear gang frame 4 by means which accommodates shifting the bar 34 to different positions, preferably by such means as a pair of U-bolts 36. The interconnecting links 21 and 22 are disposed in contact with one another so that the harrow runs level in operation and does not tend to dig in at one end of one gang or at the other end of the other gang.

The harrow 1 is adapted to be connected to a source of power, such as a farm tractor, by a hitch structure, indicated in its entirety by the reference numeral 40. The hitch structure 40 comprises a hitch bar 41 having a bifurcated portion 42 formed at its forward end and apertured to receive a hitch pin 43 by which the harrow may be connected to the drawbar 44 of a tractor. The bar 41 is bent laterally outwardly and rearwardly at its rear portion and has its central portion reenforced by a generally triangular shaped plate 45. The hitch structure 40 also includes a bracing member 47 which at its forward end is pivotally connected, as at 48, to the plate 45, the member 47 comprising two telescopically associated parts 51 and 52 which have a plurality of apertures providing for attachment of one part to the other in different positions of adjustment thereby to vary the amount of offset relative to the propelling tractor.

An angling lever 56 is pivotally mounted, as at 57, on a forwardly extending bracket 58 that is fixed, as by welding or the like, to the front bar 5 of the front gang frame 4. In the succeeding description and in the appended claims it is considered that the lever 56 constitutes a bell crank member having three arms, one consisting of the structure of the member 56 that extends from the pivot 57 to the pivot 71, the second consisting of the structure of the member 56 that extends from the pivot 57 to the pivot 121, and the third arm consisting of the structure of the member 56 that extends from the pivot 57 to the pivot 75, the pivots 71, 75 and 121 being referred to in detail below. The first and second arms of the bell crank 56 constitute a pair of arms that extend generally from the pivot 57 toward the left side of the implement 1 while the third arm extends generally toward the right side of the implement, particularly in the working position of the harrow. Structurally, the angling bell crank lever 56 comprises a first bar 65 fixed, as by welding, to a pivot plate 66 that is apertured to receive the pivot 57 carried by the bracket 58, the latter member including upper and lower sections 58a and 58b welded at their rear ends to the front frame bar. The outer end of the bell crank bar 65 is turned downwardly and then inwardly, as indicated at 69, the adjacent portions being apertured to receive a pivot pin 71 by which the rear end of the hitch bar 41 is pivotally connected therewith. This portion of the bar, which forms a part of said first arm of the bell crank, is reenforced by a bracing section 72 the rear or inner portion of which is apertured to receive the lower portion of the pivot pin 57. By virtue of this construction, just described, the bell crank member 56 is rigid in a generally vertical direction. The second arm of the bell crank 56 is formed by means including the plate 66, and a third arm of the bell crank 56 is formed by means including an extension 74 of the bar 65, the extension 74 being apertured to receive a quick detachable pin 75 by which one end of an adjustable angle-determining means may be connected, such means being adapted to be connected at its other end by a pivot pin 76 with a lug 77 carried adjacent one end of the front disk gang frame 4. Preferably, as best shown in Figure 6, the bracket or lug 77 receiving the pin 76 comprises a generally V-shaped bar having one portion welded to the front frame bar, an upper portion 78 extending forwardly and apertured to receive the pin 76 and a lower portion 79 which is bent rearwardly, downwardly and then forwardly, and apertured, to receive a pin 81 by which the rear end of the adjustable hitch member brace 47 may be pivotally connected to the front gang 4. The lug or bracket 77 is reenforced by a brace 82 extending to the rear frame bar, as best shown in Figure 3.

It will be understood by those skilled in the art that in operation the gangs of an offset disk harrow are arranged at an angle to one another and the hitch is adjusted so that the couple established by the tendency of the disks of the front gang to run in one direction and the tendency of the disks of the rear gang to run in the other direction serve to hold the disk harrow implement at one side of the line of draft pull that normally extends through the front end of the hitch bar 41 where the same is connected at 43 to the drawbar 44 of the tractor. It will be also understood that the harrow may be arranged for transport by reducing the angle between the disk gangs to substantially zero, whereupon the disks will roll forwardly without cutting into the ground. Some tractors are provided with a double acting ram or jack which forms a part of the hydraulic power lift unit of the tractor. The harrow of the present invention is admirably adapted to be used with tractors of this type, in which case the hydraulic ram unit, indicated in Figure 1 by the reference numeral 90, is connected at opposite ends by the pins 75 and 76 to the bell crank 56 at one side of the front gang and the lug or bracket 77 at the other side of the front gang, the first mentioned connection being made directly to the front gang while the other connection is made directly to the inner or third lever arm 74 of the bell crank 56. With the hydraulic ram 90 arranged in this position, extension or retraction of the ram unit results in swinging the bell crank 56 in one direction or the other thereby swinging the front and rear gangs 2 and 3 into and out of straightened and angled positions. The angle between the gangs in their working position may be increased or decreased, as desired, by directing fluid under pressure to the unit 90 so as to extend or retract the same the amount necessary to effect the desired change in the angle. Likewise, the angles may readily be brought into their straightened or transport position (Figure 2) by extension of the hydraulic ram unit 90. When a double acting hydraulic ram unit, such as the one indicated by the reference numeral 90, is employed the same acts between the bracket 77 and the bell crank 56 for positively and rigidly holding the gangs in different angles, as desired, or in their transport or parallel position, and in operation any tendency for the gangs to run out of angle is resisted by the connection of the double acting unit 90 between the bell crank 56 and front gang frame 4, the bell crank being held against movement relative to the front gang. However, in other instances the tractor which the farmer has available for propelling the disk harrow may not be equipped with a hydraulic power lift cylinder or ram unit, and the harrow of the present invention is also adapted to be used with tractors having no power lift cylinders or rams. Where a unit, such as the unit 90, is not available, we provide a second form of angle-determining means and connect the same by the pins 75 and 76 to the bell crank and front gang frame in the same manner as the unit 90 is connected. The angle-determining means employed where no hydraulic cylinder is available is indicated in its entirety in Figures 4-6 by the reference numeral 100. The angle-determining unit 100 comprises a bar 101 having a bifurcated end section 102 apertured to receive the associated pivot pin 76. The bar 101 is slidably disposed in a tubular section 103 formed at the rear or outer end of the forward member 104, the latter including a pair of apertured bars 105 connected, as by welding, to the sleeve section 103. The forward ends of the bars 105 are apertured to receive the pivot pin 75. The forward end of the bar 101 extends between the bars 105 in telescopic association and the movement of the bar 101 into the other bar 105 is limited by means of a quick detachable pin 108 carried by a flexible chain 109 on the member 104. The pin 108 is disposable in any one of several sets of openings 111 formed in the bars 105. The pin 108 serves as a stop limiting the inward movement of the bar and, as best shown in Figure 5, this provides for disposing the gangs in any one of several angled operating positions. A second set of openings 112 is formed in the bars 105, and the front end of the bar 101 is likewise provided with an opening 113 which, when brought into the proper position registers with one of the pairs of openings 112 so that when the pin 108 is inserted in the opening 112 as well as the opening in the front end of the bar 101, serves to lock the telescopically associated members 101, 104 against relative movement in either direction, whereby the bell crank unit 56 is likewise held against rocking movement in either direction about its point of pivotal support at 57.

When the angle adjusting unit 100 is used in lieu of a power cylinder 90, the operation of the implement is substantially as follows.

When the harrow 1 is hitched to the drawbar 44 of the tractor, and the tractor driven forwardly, the draft pull is transmitted through the hitch structure 47 to the right end of the front gang 2 and to the bell crank 56 at the other end of the hitch structure. The pull being thus transmitted directly to the right end of the front gang, the front gang is thus pulled into an angled position while the resulting rocking movement of the bell crank 56 is transmitted through an angling link 120 to the rear gang adjacent the left end of the latter. The angling link 120 is connected by means of a pivot 121 to the bell crank 56 while the rear end of the link 120 is connected to the pivot 28 on the left end of the rear gang, this pivot connection being made at the left side of the pivotal connection between the front and rear gangs, whereby as the forward draft swings the bell crank 56 in a clockwise direction, as viewed in Figure 4, a forward pull is transmitted through the link 120 to the left end of the rear gang, thus pulling the latter into an angled position (Figure 5) at the same time that the forward gang is pulled into an angled position. The parts are arranged so that when the harrow reaches its working position, the pivot point 121 moves into a position closely adjacent the pivot 57 while the pivot connection 71 between the hitch structure 40 and the bell crank 56 is at a considerable distance from the pivot 57. In this way, the forward draft pull, applied at the pivot 71, acts with an appreciable mechanical advantage to pull the rear gang into an angled position. The rear gang under adverse soil conditions may tend to run out of angle, but this tendency is opposed by the fact that the line of pull transmitted through the link 120 passes quite close to the pivot 57, the moment arm being indicated in Figure 5 by the reference character a, whereas the forward draft pull, transmitted to the pivot point 71, acts with a much longer lever arm, as indicated by the reference character b in Figure 5. Therefore, regardless of soil conditions, the draft pull acts with sufficient force to hold the gangs in their angled position under all conditions of operation.

Normally, the gangs are straightened by backing the outfit, the soil resistance against the disks serving to swing them into their transport or parallel position, as shown in Figure 4. This backing action causes the bell crank 56 to turn in a counterclockwise direction, thereby withdrawing the bar 101 from within the forward portions of the bars 105. When the gangs reach their straightened position, the operator may remove the pin 108 from the openings 111 and drop the pin into one of the outward set of openings 112, in which position the front end of the bar 101 comes into abutting relation with the pin 108. This determines the transport position of the gangs, and the outfit may be driven forwardly along a road, lane or the like and the disks will roll freely. In operation, a left turn is normally made with the gangs in their angled position, as shown in Figure 5, but if it should be desired to make a right turn, which ordinarily is not required very frequently, an offset turning bar 125 may be fixed to the rear of the tractor and connected by a turning chain 126 to the front gang. Thus, when the tractor is turned to the right, the gangs will readily move into an angled position with the gangs converging toward the right side of the outfit, the rod 101 moving to the right (Figure 4) away from the pin 108 in the left hand opening 112 to accommodate this action. For backing the outfit, it is necessary to lock the gangs against swinging out of their parallel position in either direction, and in order to lock the bell crank against movement in either direction and so hold the gangs, the pin 108 is placed in the right hand opening 112 and also through the opening 113 in the front end of the bar 101, whereupon the bell crank 56 is locked against movement in either direction.

While we have shown and described above the preferred structure in which the principles of the present invention are to be incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An offset disk harrow adapted to be used with a tractor having a double action hydraulic adjusting unit, comprising front and rear gangs pivotally interconnected for movement into and out of straightened and angled positions, a generally horizontal, fore-and-aft extending hitch structure having sides and connected at one side to the front gang adjacent one end thereof, a bell crank pivotally mounted for movement in a general horizontal plane on the front gang generally adjacent the other end thereof, said bell crank having a pair of arms, one arm extending generally laterally outwardly toward said other end of the front gang, means pivotally connecting the other side of said hitch structure to said laterally outwardly extending bell crank arm, an angling bar connected to the rear gang at one side of the pivotal interconnection between said gangs whereby generally longitudinal movement of said angling bar will cause said rear gang to move angularly relative to the front gang, means pivotally connecting the forward end of said angling bar with the other arm of said bell crank, and means on said bell crank and said front gang for receiving the tractor power operated unit, whereby operation of the latter in one direction or the other serves to swing said bell crank and shift said gangs between angled and straightened positions.

2. An offset disk harrow comprising front and rear gangs pivotally interconnected for movement into and out of angled and straightened positions, a bell crank having a pair of arms pivotally mounted on the front gang adjacent one end thereof, a generally horizontal, fore-and-aft extending hitch structure having sides and pivotally connected at one side to the front gang adjacent the other end thereof and at the other side to one of said arms, an angling connection between the other arm of said bell crank and the rear gang, application of a propelling force to said hitch structure acting through said one bell crank and said other end of said front gang for pulling said gangs into an angled position, a pair of telescopically associated members connected, respectively, to said bell crank and to said front gang, said members having a plurality of apertures, and a stop member disposable in selected apertures optionally for controllably limiting the movement of said bell crank relative to said front gang for optionally determining the working angle between said gangs, holding said gangs against movement into an angled position and locking said gangs against movement in either direction out of a straightened or parallel position.

3. An offset disk harrow comprising front and rear gangs pivotally connected together for movement between angled and transport positions, a generally horizontal, fore-and-aft extending hitch structure having sides and pivotally connected at one side with the forward gang adjacent one end thereof, an angling bar connected at its rear end with the rear gang and extending forwardly therefrom, bell crank means pivotally mounted on the front gang and including a pair of arm sections disposed at an angle to one another and extending generally from the same side of the pivot of the bell crank on the front gang and generally toward the other side of said front gang, one arm section being longer than the other, means pivotally connecting the other side of said hitch structure to the outer end of the longer of said arm sections, and means connecting the forward end of said angling bar with the shorter of said arm sections, the angle between the latter being such that when the gangs are in angled position the longer arm section extends generally laterally while the shorter arm section extends forwardly to such a degree as to bring the line connecting the front and rear pivots of the angling bar appreciably closer to the pivot of the bell crank means than the point of pivotal connection of the hitch structure with the outer end of the longer arm section, whereby the draft pull applied to the outer end of said longer arm section acts with sufficient mechanical advantage through the shorter arm section against the angling bar to hold the rear gang in angled position.

4. An offset disk harrow comprising front and rear gangs pivotally connected together for movement between angled and transport positions, a generally horizontal, fore-and-aft extending hitch structure having sides and pivotally connected at one side with the forward gang adjacent one end thereof, an angling bar connected at its rear end with the rear gang and extending forwardly therefrom, bell crank means pivotally mounted on the front gang and including a pair of arm sections disposed at an angle to one another and extending generally from the same side of the pivot of the bell crank on the front gang and generally toward the other side of said front gang, means pivotally connecting the other side of said hitch structure to the outer end of one of said arm sections, and means connecting the forward end of said angling bar with the other of said arm sections, the angle between the latter being such that when the gangs are in angled position said one arm section extends generally laterally while the other arm section extends forwardly to such a degree as to bring the line connecting the front and rear pivots of the angling bar appreciably closer to the pivot of the bell crank means than the point of pivotal connection of the hitch structure with the outer end of said one arm section, whereby the draft pull applied to the outer end of said one arm section acts with sufficient mechanical advantage through said other arm section against the angling bar to hold the rear gang in angled position.

5. An offset disk harrow comprising front and rear gangs, means disposed intermediate the ends of the gangs for pivotally connecting them together for movement into and out of angled and transport positions, a hitch structure, means connecting one side of the hitch structure to the front gang at one side of said pivotal interconnecting means between the gangs, a bell crank mounted on the front gang generally adjacent the other end thereof and including a pair of arms, an angling bar connected at its forward end with one of said arms and at its rear end with the rear gang generally at the other side of said pivotal interconnecting means between the gangs, and means pivotally connecting the other side of said hitch structure with the other of said bell crank arms whereby a forward pull transmitted to said bell crank exerts a force tending to rotate said bell crank and move said angling link forwardly to swing said rear gang into angled position, said bell crank having a third arm, and an extensibly adjustable bar connecting said third arm with said one end of said front gang, adjustment of said extensible bar determining the amount of offset of said gangs in their working position.

6. An offset disk harrow comprising front and rear gangs pivotally interconnected for movement into and out of straightened and angled positions, a hitch structure connected at one side to the front gang adjacent one end thereof, a bell crank pivotally mounted for movement in a general horizontal plane on the front gang generally adjacent the other end thereof, means pivotally connecting the other side of said hitch structure to one portion of said bell crank, an angling bar connected to the rear gang at one side of the pivotal interconnection between said gangs whereby generally longitudinal movement of said angling bar will cause said rear gang to move angularly relative to the front gang, means pivotally connecting the forward end of said angling bar with the other portion of said bell crank, an apertured lug carried by said bell crank and a separate apertured lug carried by the front gang adjacent said one end, and angle-determining means comprising a pair of relatively adjustable parts connected between said lugs for limiting the movement of the bell crank in the direction thereof that corresponds to the movement of the gangs into an angled working position.

7. An offset disk harrow comprising front and rear gangs pivotally interconnected for movement into and out of angled and straightened positions, a bell crank pivotally mounted on the front gang adjacent one end thereof, a hitch structure pivotally connected at one side to the front gang adjacent the other end thereof and at the other side to said bell crank, an angling connection between said bell crank and the rear gang, and a pair of telescopically associated parts connected between said bell crank and said front gang and including adjustable abutment means limiting the movement of said bell crank in one direction when said gangs are in their straightened or transport position, said telescopically associated parts accommodating the movement of the bell crank in the other direction to facilitate turning the harrow in one direction.

8. An offset disk harrow comprising front and rear gangs pivotally interconnected for movement into and out of angled and straightened positions, a bell crank pivotally mounted on the front gang adjacent one end thereof, a hitch structure pivotally connected at one side to the front gang adjacent the other end thereof and at the other side to said bell crank, an angling connection between said bell crank and the rear gang, application of a propelling force to said hitch structure acting through said one bell crank and said other end of said front gang for pulling said gangs into an angled position, a pair of telescopically associated members connected, respectively, to said bell crank and to said front gang, said members having a plurality of apertures, and a stop member disposable in selected apertures optionally for controllably limiting the movement of said bell crank relative to said front gang for optionally determining the working angle between said gangs and holding said gangs against movement into an angled position, said apertures being arranged in two groups, one group being located on said members to determine the angled position of said gangs and the other group being located so as to determine the straightened position of said gangs.

WILLIAM P. OEHLER.
CHARLES H. YOUNGBERG.

REFERENCES CITED

The following references are of record in the file of this patent:

UNITED STATES PATENTS

| Number | Name | Date |
|---|---|---|
| 2,152,928 | Sjogren et al. | Apr. 4, 1939 |
| 2,237,009 | Mitchell | Apr. 1, 1941 |